United States Patent [19]

Matsuda et al.

[11] Patent Number: 4,768,053

[45] Date of Patent: Aug. 30, 1988

[54] DISTANCE MEASURING APPARATUS

[75] Inventors: Motonobu Matsuda, Kawachinagano; Yoshihiro Tanaka, Osaka; Motohiro Nakanishi, Kobe; Nobuyuki Taniguchi, Nishinomiya; Hiroshi Ootsuka, Sakai, all of Japan

[73] Assignee: Minolta Camera Kabushiki Kaisha, Osaka, Japan

[21] Appl. No.: 945,500

[22] Filed: Dec. 23, 1986

[30] Foreign Application Priority Data

Dec. 25, 1985 [JP] Japan .................... 60-297061

[51] Int. Cl.$^4$ .................... G03B 3/00; G01C 3/08
[52] U.S. Cl. .................... 354/403; 356/4
[58] Field of Search ............ 354/403, 429, 432, 126, 354/413, 415, 165, 127.13; 250/201 AF, 201 PF; 356/1, 4

[56] References Cited

U.S. PATENT DOCUMENTS

| | | | |
|---|---|---|---|
| 3,747,488 | 7/1973 | Bennett | 354/126 |
| 4,306,787 | 12/1981 | Fukuhara et al. | 354/432 |
| 4,349,257 | 9/1982 | Friedman et al. | 354/126 |
| 4,415,245 | 11/1983 | Harvey | 354/403 |
| 4,420,252 | 12/1983 | Nakauchi | 354/432 X |
| 4,423,936 | 1/1984 | Johnson | 354/403 |
| 4,500,189 | 2/1985 | Aoki | 354/407 |
| 4,670,645 | 6/1987 | Ohtaka et al. | 250/201 PF |

FOREIGN PATENT DOCUMENTS 59-17514 1/1984 Japan .
60-27936 7/1985 Japan .

Primary Examiner—W. B. Perkey
Attorney, Agent, or Firm—Burns, Doane, Swecker & Mathis

[57] ABSTRACT

A distance measuring apparatus of the present invention converges the reflected light on objects through a converging lens and detects the light by a multi-divisional photodiode. The multi-divisional photodiode comprises a plural number of light receiving elements so that each of the light receiving elements detects the reflected light from the corresponding object to provide an electric signal according to the quantity of reflected light. The quantity of light in the peripheral portions of the flash or the converging lens is inherently smaller than the quantity of light in the central portion thereof. This distance measuring apparatus is improved so that a constant electric signal is obtained by any of the light receiving elements as far as the distance to the objects is constant. For example, such improvement is made in a manner in which: the quantity of received light of the central portion is limited by a filter provided between the converging lens and the multi-divisional photodiode; the light receiving areas of the light receiving elements are increased in peripheral portions of the multi-divisional photodiode compared with those in the central portion thereof; or the obtained electric signal is electrically corrected.

27 Claims, 8 Drawing Sheets

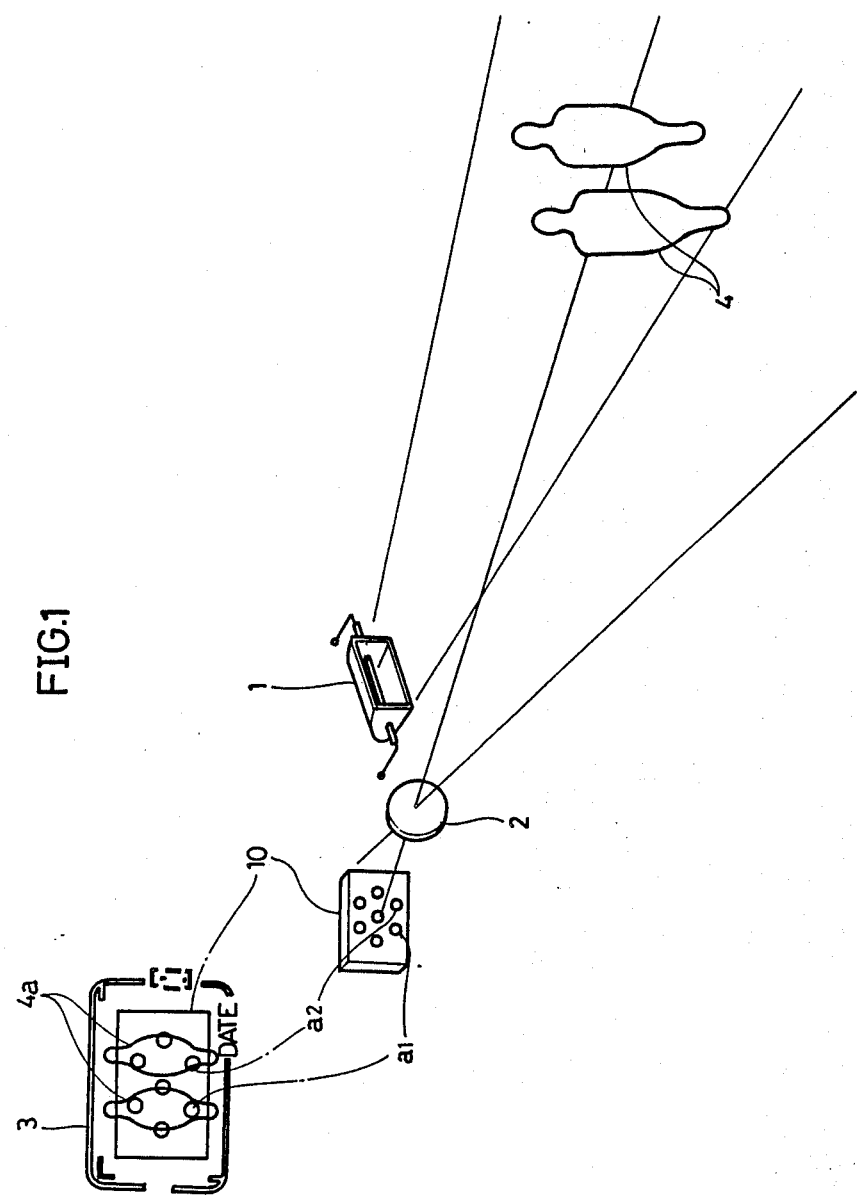

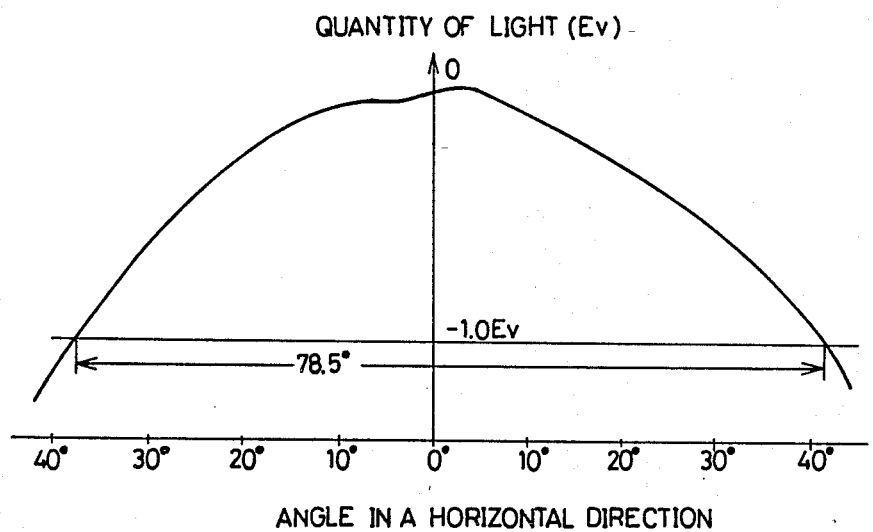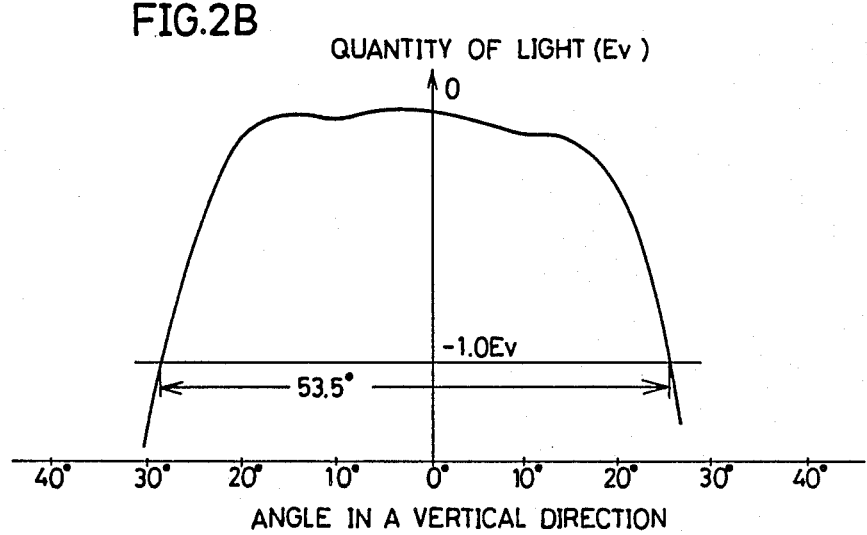

DISTANCE MEASURING APPARATUS

BACKGROUND OF THE INVENTION

1. Field of the Invention

The present invention relates to a distance measuring apparatus and particularly to a distance measuring apparatus applied to a photographing apparatus so that the photographing apparatus can determine a distance to an object to be photographed. More particularly, the present invention relates to an improvement of measuring precision of a distance measuring apparatus for detecting a distance to an object by detecting light from the object.

Description of the Prior Art

As an example of a distance measuring apparatus, there is known an apparatus for detecting a distance to an object based on light from the object. Such a conventional apparatus is disclosed for example in U.S. Pat. No. 4,500,189. The distance measuring apparatus of this patent electrically compensates a measured value and compensates pitches of a mask of a light receiving surface so that an error in image height at the time of detection can be compensated. However, the error in image height to be compensated is not an error caused by decrease of a quantity of detected light in the distance measuring apparatus.

On the other hand, as for a light measuring apparatus in a camera, a technique for compensating a decrease of a quantity of detected light inherently caused by the apparatus has been already proposed. For example, U. S. Pat. No. 4,306,787 discloses a technique for electrically compensating a value of measured light in the opened state of a stop in the peripheral portion of the film surface taking account of a decrease of quantity of light in the peripheral portion of a photographing lens and a difference compared with the distribution of illumination on the film surface at the time of stopping down by the diaphragm. In addition, Japanese Patent Publication No. 27963/1985 discloses a filter for compensating a decrease of the quantity of light in the peripheral portions of a lens.

SUMMARY OF THE INVENTION

An object of the present invention is to provide a distance measuring apparatus for detecting precisely a distance to an object by compensating an amount of decrease of a quantity of light to be detected when such decrease is caused by the construction of the distance measuring apparatus itself.

According to the present invention, a decrease of a quantity of detected light caused by the construction of a distance measuring apparatus itself, for example, by such a factor as decrease of the quantity of light in peripheral portions of a converging lens can be compensated appropriately and thus a detection precision of the distance measuring apparatus can be improved.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an illustration roughly showing a distance measuring apparatus of a first embodiment of the present invention.

FIGS. 2A and 2B are graphs showing light distribution characteristics of a flash.

DESCRIPTION OF THE PREFERRED EMBODIMENTS

First Embodiment

Figure 3:
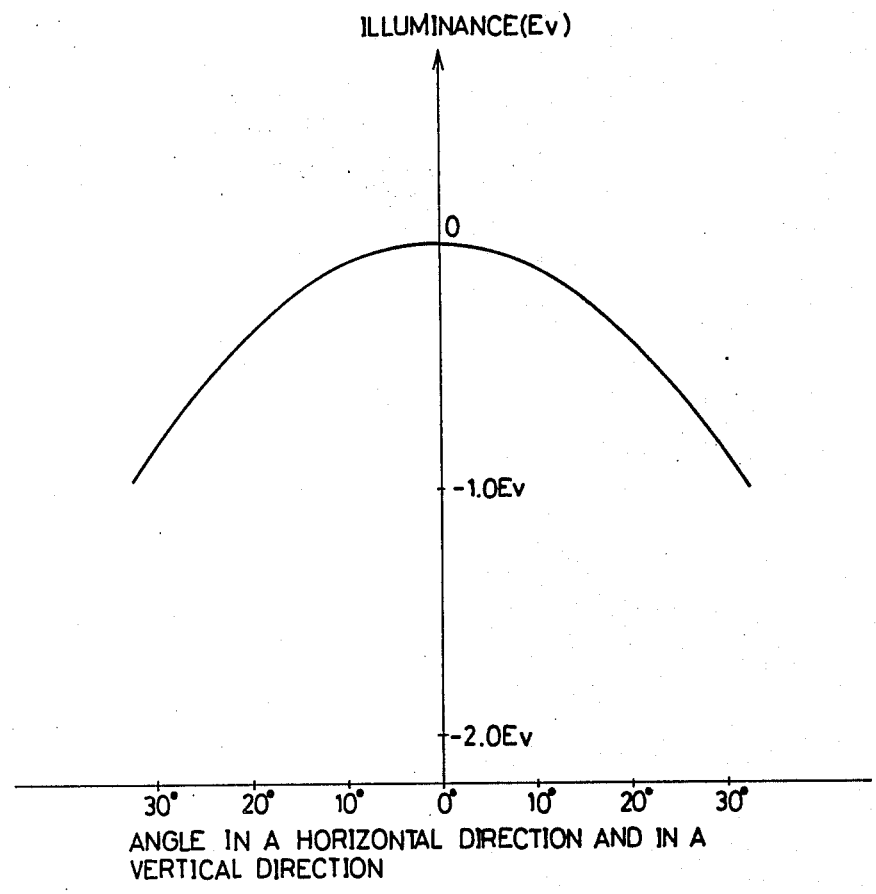
FIG. 3 is a characteristic diagram of an image surface illuminance ratio of a light receiving lens.

FIG. 1 is an illustration showing an outline of a distance measuring apparatus of a first embodiment of the present invention.

Referring to FIG. 1, the reference numeral 1 indicates a flash having light distribution characteristics equal to those utilized in ordinary flash photography. A filter for cutting a visible radiation regions is provided in front of the flash 1. When the flash 1 operates, light having a wavelength in the infrared region is emitted over the whole area to be photographed. The reference numeral 2 indicates a light receiving lens structured to have the same field of vision as for a photographing lens.

The reference numeral 10 indicates a multi-divisional silicon photodiode which comprises a plurality of silicon photodiode elements a1, a2 etc. A field angle of the multi-divisional silicon photodiode 10 obtained through the light receiving lens 2 is equal to a field angle applied to a film surface through the photographing lens (not shown). The reference numeral 3 indicates a finder view field where positions of an object image 4a on the film surface and positions of the multi-divisional silicon photodiode 10 and the individual silicon photodiode elements a1, a2 etc. are indicated.

The light emitted from the flash 1 is applied to an object 4, which is humans in this case. The light reflected on the object 4 is converged onto the multi-divisional silicon photodiode 10 through the light receiving lens 2.

The quantity of light applied to each of the silicon photodiode elements a1, a2 etc. of the multi-divisional silicon photodiode 10 is expressed in the following manner. More specifically, if the object 4 is contained in an effective region of one of the silicon photodiode elements (a), the quantity of light B applied to this silicon photodiode element is expressed by the following equation assuming that: reflectance of the object 4 is M, luminous quantity of the flash 1 is A, a distance from the camera to the object 4 is X and a proportional constant is K.

$$B = K \cdot M \cdot A \cdot (1/X^2) \quad (1)$$

Thus, if the luminous quantity A is constant, the quantity of light B is determined by the reflectance M of the object 4 and the distance X to the object 4.

Generally, reflectance of an object with respect to light in the infrared regions is within a relatively narrow range, that is, half to twice the average reflectance thereof. Thus, a change amount of the reflectance M is not large.

Therefore, if the quantity of light B is measured, it can be determined from the equation (1) that the distance X to the object 4 is within a certain range. More specifically, the distance X to the object in case of the reflectance M being minimum and the distance X to the object in case of the reflectance M being maximum can be determined based on the calculated quantity of light B.

The silicon photodiode elements $a_1$, $a_2$ etc. are disposed in association with the field angle so as to be represented in the finder 3 and, based on the light quantities $B_1$, $B_2$ etc. received by the silicon photodiode elements $a_1$, $a_2$ etc., distances to the object in the portions detected by the silicon photodiode elements $a_1$, $a_2$ etc. are calculated. If the focusing of the photographing lens is determined based on the most suitable distance X to the object out of the calculated distances, the object can be photographed with the appropriate distance which takes no trouble in real photographing operation. In other words, the photographer can take a photograph with an arbitrary composition, taking no account of measured distance.

In such a distance measuring apparatus, it is necessary to take account of the light distribution characteristics of the flash 1 and the characteristics of the light receiving lens 2 in order to measure a distance more accurately. In the following, the light distribution characteristics of the flash 1 and the characteristics of the light receiving lens 2 will be described.

FIGS. 2A and 2B show light distribution characteristics of the flash 1 in the distance measuring apparatus of the first embodiment. Particularly, FIG. 2A shows light distribution characteristics in a horizontal direction and FIG. 2B shows light distribution characteristics in a vertical direction. In those diagrams, the abscissa represents an angle from an optical axis and the ordinate represents, in Ev, a difference from a reference value 0 of the quantity of light on the optical axis.

As can be seen from FIGS. 2A and 2B, if objects at the same distance are considered, the quantity of light is decreased as the angle from the optical axis increases.

FIG. 3 shows an illuminance ratio of the image surface of the light receiving lens 2 in the distance measuring apparatus of the first embodiment. A plane object having uniform brightness is located at a prescribed distance from the light receiving lens 2. Illuminance values of the image of the plane object at a focus position of the light receiving lens 2 are not uniform and as shown in FIG. 3, those values decrease according to the angle from the optical axis. In FIG. 3, in the same manner as in FIGS. 2A and 2B, the abscissa represents an angle from the optical axis and the ordinate represents, in Ev, a change amount of the illuminance of the plane object with respect to the illuminance of the plane object on the optical axis regarded as a reference value 0. The characteristics shown in FIG. 3 are the same in the horizontal and vertical directions.

From FIG. 3, it is understood that, even in the case of a plane object having uniform brightness, the illuminance of the image of the object changes dependent on whether the light from the object is refracted at a central portion (on the optical axis) of the light receiving lens 2 or at a peripheral portion thereof. In other words, it is understood that the illuminance of the image of the object decreases as an angle of incidence of light emitted from the object increases with respect to the optical axis.

Thus, the illuminance of the object at a position distant from the optical axis is decreased by an amount corresponding to a sum of a decreased amount in FIGS. 2A and 2B and a decreased amount in FIG. 3 compared with the illuminance of the object on the optical axis. The total decreased quantity of light is shown in FIGS. 4A and 4B.

Figure 4A:
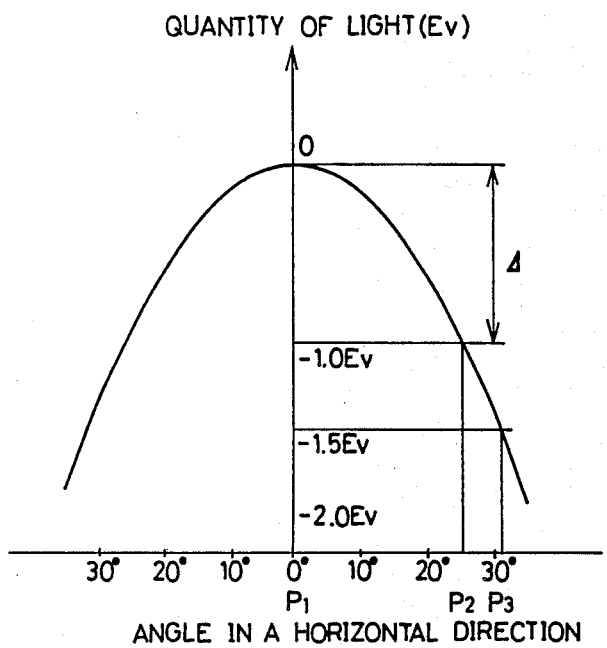
FIGS. 4A and 4B are characteristic diagrams in which the characteristics shown in FIGS. 2A and 2B and the characteristics shown in FIG. 3 are synthesized.
Figure 4B:
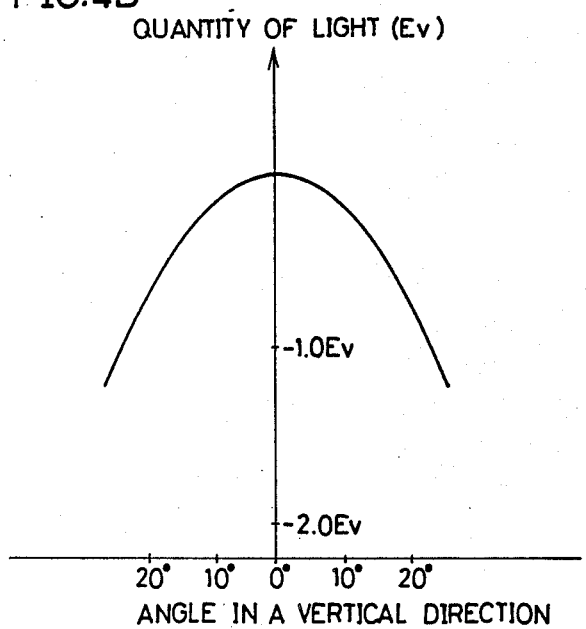

In FIGS. 4A and 4B, the abscissa represents an angle from an optical axis and the ordinate represents a difference in Ev from a quantity of light on the optical axis regarded as a reference value 0. FIG. 4A represents characteristics in the horizontal direction and FIG. 4B represents characteristics in the vertical direction.

As is clearly understood from FIGS. 4A and 4B, the light distribution characteristics of the flash 1 and the image surface illuminance ratio of the light receiving lens 2 exert a considerably large influence on the quantity B of received light.

In the first embodiment of the invention, the effective areas of the silicon photodiode elements $a_1$, $a_2$ etc. of the multi-divisional silicon photodiode 10 are changed so as to remove such influence exerted by the light distribution characteristics of the flash 1 and the image surface illuminance ratio of the light receiving lens 2 onto the quantity B of received light and to prevent decrease of the quantity of light dependent on an angle deviating from the optical axis as a parameter.

More specifically, if the area of the silicon photodiode element on the optical axis P1 is regarded as "1", the area of the silicon photodiode element at the point P2 with an angle causing the total decreased quantity of light to be decreased by 1 Ev, for example, is made to be "2", because $\frac{1}{2}^{-1} = 2$. Further, the area of the silicon photodiode element at the point P3 with an angle causing a decrease 1.5 Ev is made to be "2.83", because $\frac{1}{2}^{-1.5} \approx 2.8284$. In general, the area of a silicon photodiode element at the point Pn causing a decrease X Ev is regarded as $\frac{1}{2}^{-X}$.

With respect to an angle deviating from the optical axis in FIG. 4B, the area of a silicon photodiode element at a point Pm causing a decrease Y Ev is regarded as $\frac{1}{2}^{-Y}$.

Figure 5:
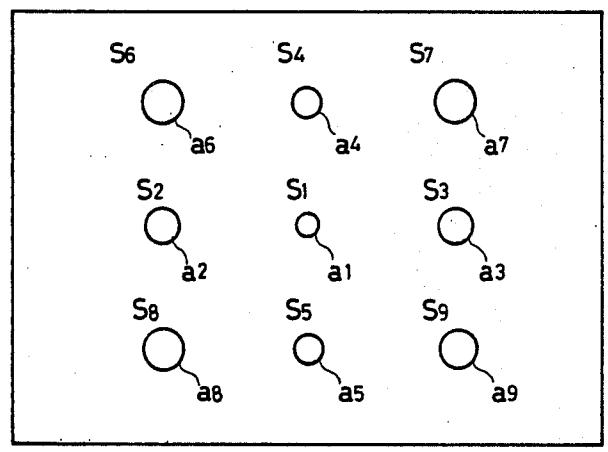
FIG. 5 is an illustration for explaining correcting means in the first embodiment.

FIG. 5 shows a concrete example of arrangement of the silicon photodiode elements in the first embodiment. Regarding the area $S_1$ of the silicon photodiode element $a_1$ on the optical axis as a reference area, the areas $S_2$ and $S_3$ of the silicon photodiode elements $a_2$ and $a_3$, respectively, located to the left and to the right therefrom at an equal distance are equal to each other. The areas $S_4$ and $S_5$ of the silicon photodiode elements $a_4$ and $a_5$, respectively, located at an equal distance on the upper and lower sides of the silicon photodiode element $a_1$ are equal to each other. The areas $S_6$ to $S_9$ of the four silicon photodiode elements $a_6$ to $a_9$, respectively, located in oblique directions from the silicon photodiode element $a_1$ are equal to one another. Thus, the following relation is established.

S6=S7=S8=S9>S2=S3>S4=S5>S1

Thus, in this embodiment, the total decreased quantity of light according to the angle of incidence is compensated with reference to the optical axis by changing the area of the silicon photodiode element located at that angle. Consequently, when the light emitted from the flash 1 is reflected on the plane object and applied to the respective silicon photodiode elements a1, a2 etc., the quantity of light detected for each silicon photodiode element is equal. Thus, a distance to the object can be measured precisely based on the quantity of received light of each silicon photodiode element.

Second embodiment

A second embodiment of the present invention will be described in the following.

In the second embodiment, a photographing range is divided into a suitable number of zones, a stop point of the photographing lens being provided in each zone, and by measuring a distance to the object 4, the photographing lens is stopped at a stop point of a zone in connection with the measured distance. In this case, determination of a zone is made by comparing the output of a silicon photodiode element with a determined level. By making the detected levels of the outputs of the silicon photodiode elements a1, a2 etc. have differences, influence of the light distribution characteristics of the flash 1 and the image surface illuminance ratio of the light receiving lens 2 can be prevented from exerting on the quantity B of received light.

More specifically, the levels to be detected of the outputs of the respective silicon photodiode elements a1, a2 etc. are set to levels causing no decrease in the quantity B of received light due to the light distribution characteristics and the image surface illuminance ratio. Then, by comparing the outputs of the repective silicon photodiode elements a1, a2 etc. with the thus set levels, determination is made as to in which zone the object exists.

Figure 6:
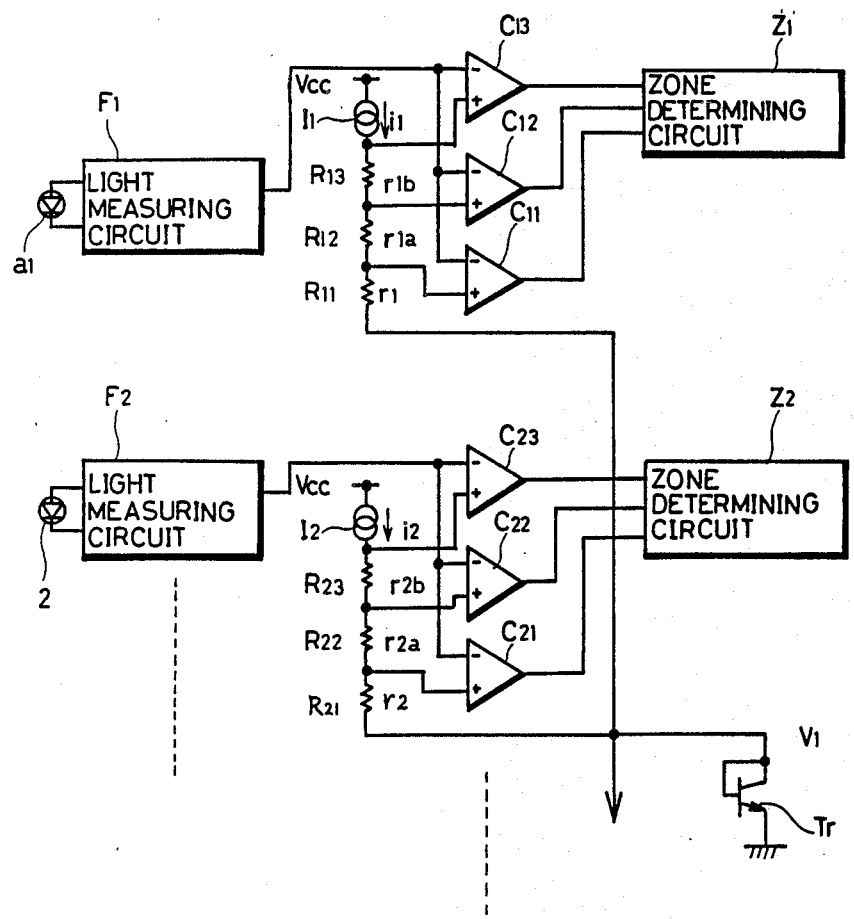
FIG. 6 is a circuit diagram of correcting means in a second embodiment of the present invention.

Description will be made more specifically in the following referring to FIG. 6. FIG. 6 is a circuit diagram of a distance measuring apparatus of the second embodiment.

A light measuring circuit F1 connected with the first silicon photodiode element a1 on the optical axis distinguishes flash light from natural light and detects and amplifies only the flash light so that the obtained signal is compressed to have a logarithmic function curve (such a circuit being described in detail, for example, in Japanese Patent Laying-Open Gazette No. 189520/1985).

An output terminal of the light measuring circuit F1 is connected to minus input terminals of comparators C11 to C13. The plus input terminals of the comparators C11 to C13 are connected to positive electrodes of resistors R11 to R13, respectively. These resistors R11 to R13 are connected in series to a DC power supply Vcc through a constant current circuit I1. A negative electrode of the resistor R11 is connected to a collector of a transistor Tr for providing a reference voltage V1. The output terminals of the comparators C11 to C13 are connected to a zone determining circuit Z1.

As for the second silicon photodiode element a2, a light measuring circuit is connected in the same manner. It is the same with the other silicon photodiode elements a3, a4 etc., though not shown.

In connection with the first silicon photodiode element a1, it is assumed that the resistance values of the resistors R11, R12 and R13 are r1, r1a and r1b, respectively, and that constant current in the constant current circuit I1 is i1.

Voltages at the plus input terminals of the comparators C11 to C13 are higher than the reference voltage V1 by:

$r1 \times i1$, $(r1+r1a) \times i1$ and $(r1+r1a+r1b) \times i1$, respectively.

Those voltages are compared with the output voltage of the light measuring circuit F1 by the comparators C11 to C13 and output signals of those comparators C11 to C13 are provided to the zone determining circuit Z1 to determine the zone in which the object exists.

Figure 7:
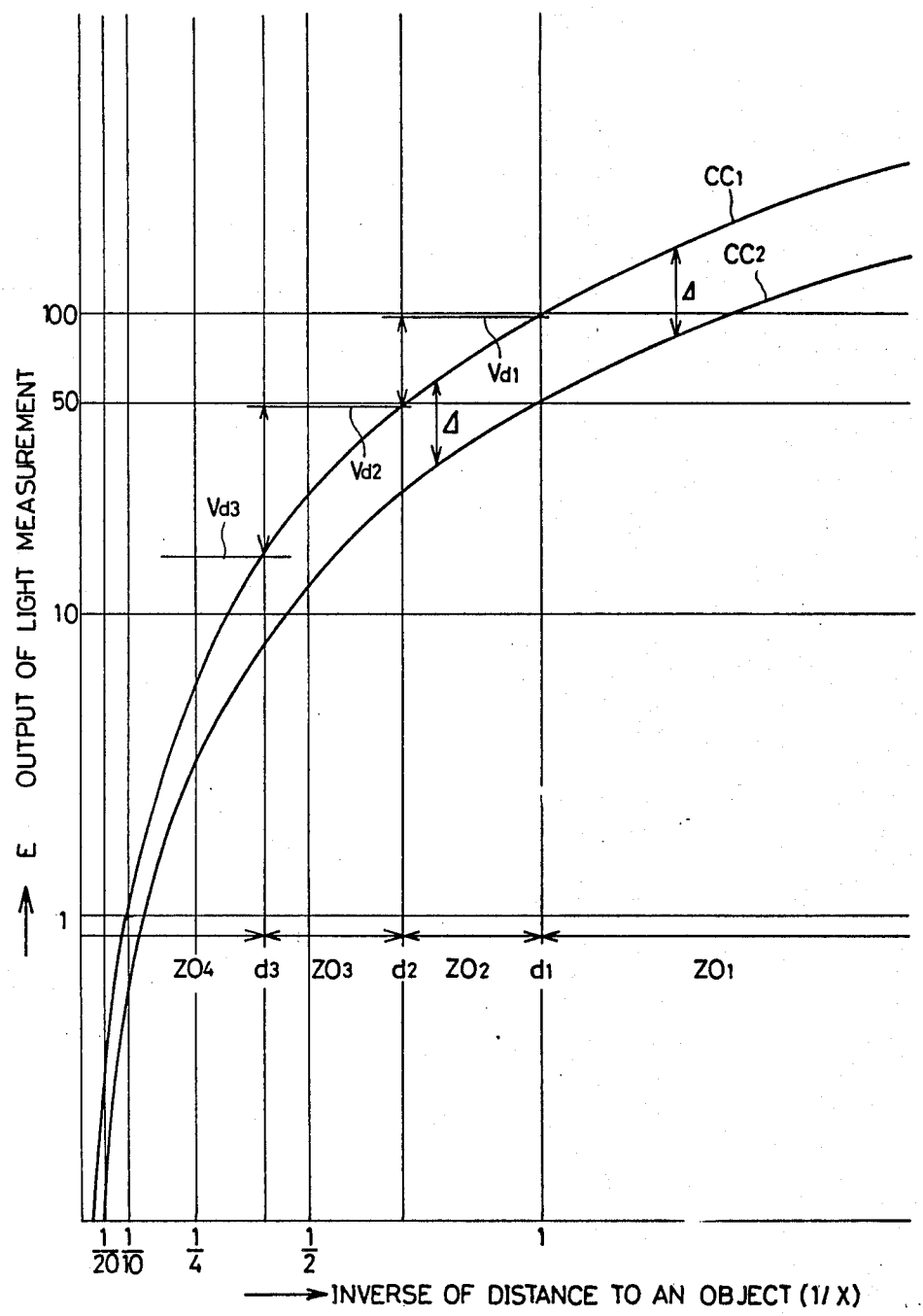
FIG. 7 is a characteristic view showing a relation between a distance to an object and output of light measurement in the second embodiment.

In the following, division of the distance to the object into plural zones will be described with reference to FIG. 7.

The characteristic curve CC1 represents a relation between the output E of the light measuring circuit F1 connected with the silicon photodiode element a1 at the point P1 (on the optical axis) shown in FIG. 4A and the distance X to the object. The scale on the ordinate representing the output E of light measurement is a logarithmic scale. The abscissa represents an inverse (1/X) of the distance X to the object based on the equation (1).

The photographing range is divided into four zones Z01 to Z04. The zones Z01 and Z02 have a boundary at a distance d1; the zones Z02 and Z03 have a boundary at a distance d2; and the zones Z03 and Z04 have a boundary at a distance d3. Voltages on the characteristic curve CC1 at the respective distances d1, d2 and d3, namely, voltages of the output E at those distances are Vd1, Vd2 and Vd3, respectively.

Those voltages Vd1, Vd2 and Vd3 are made to be voltages obtained by adding the reference voltage V1 to the above stated voltages:

$r1 \times i1$, $(r1+r1a) \times i1$ and $(r1+r1a+r1b) \times i1$, respectively. Thus, the voltages Vd1, Vd2 and Vd3 become as follows.

$Vd1 = V1 + r1 \times i1$ $Vd2 = V1 + (r1+r1a) \times i1$ $Vd3 = V1 + (r1+r1a+r1b) \times i1$ Thus, the range defined by the distance X to the object in connection with the first silicon photodiode element a1 is divided into the four zones Z01 to Z04 so that a distance can be measured in each of those zones Z01 to Z04.

The characteristic curve CC2 represents a relation between the output E of the light measuring circuit F2 connected with the silicon photodiode element a2 at the point P2 shown in FIG. 4A and the distance X to the object. A difference Δ in the output E of light measurement at the same distance between the characteristic curve CC2 and the characteristic curve CC1 is constant irrespective of the distance and this difference $\Delta$ is equal to a difference $\Delta$ between the quantity of received light at the point P1 and the quantity of received light at the point P2 shown in FIG. 4.

Consequently, a difference between the voltages Vd1 and Vd2 and a difference between the voltages Vd2 and Vd3 are equal in both cases of the characteristic curve CC1 and the characteristic curve CC2. In other words, the characteristic curve CC2 is a curve shifted to a lower side by a given amount from the characteristic curve CC1.

Also with regard to an object in the photographing range of the second silicon photodiode element a2, conditions for determining the zones Z01 to Z04 at the same distance as that to the object in the photographing range of the first silicon photodiode element a1, namely, correction conditions for preventing influence due to the light distribution characteristics of the flash 1 and the image surface illuminance ratio of the light receiving lens 2 from being exerted on the quantity B of received light are obtained by lowering the voltages of the comparators C21 to C23 of the light measuring circuit F2, namely, $$V1+r2\times i2,$$

$$V1+(r2+r2a)\times i2 \text{ and}$$

$$V1+(r2+r2a+r2b)\times i2$$

by predetermined values compared with the voltages of the comparators C11 to C13 of the light measuring circuit F1, namely, $$V1+r1\times i1,$$

$$V1+(r1+r1a)\times i1 \text{ and}$$

$$V1+(r1+r1a+r1b)\times i1,$$

respectively.

The predetermined values to be lowered are as follows.

$$i1=i2, r1a=r2a, r1b=r2b$$

Those voltages can be obtained by making the resistance value r1 and the resistance value r2 have a difference.

In the same manner as for the silicon photodiode elements a1 and a2 at the points P1 and P2 in FIG. 4A, compensation can be made for the other silicon photodiode elements at the other points.

The other construction of the second embodiment is the same as the first embodiment and therefore description thereof is omitted.

As the resistors R11, R21 etc., variable resistors are preferably used, because the resistance values r1, r2 etc. can be regulated to compensate irregularities in the light distribution characteristics and the image surface illuminance ratio. The regulation of those resistance values may be made in association with compensation of irregularity in the characteristics of the light receiving device per se.

In the second embodiment, the circuit configuration tends to be complicated because determination levels are set to the respective light measuring circuits F1, F2 etc.

Therefore, it may be considered to combine the compensation manner of the first embodiment and the compensation manner of the second embodiment. For example, there are provided only about two levels of determination of the zones and compensation for the components not covered by those levels is made by providing silicon photodiode elements having different areas. This example has an advantage that there is not a considerable difference in the areas of the silicon photodiode elements and the circuit can be simplified.

Third embodiment

A third embodiment of the present invention will be described in the following.

In the third embodiment, in order to prevent influence of the light distribution characteristics of the flash 1 and the image surface illuminance ratio of the light receiving lens 2 from being exerted on the quantity B of received light, there is provided an optical member between the light receiving lens 2 and the multi-divisional silicon photodiode 10.

More specifically, since the quantity B of received light is the largest on the optical axis and decreases according to the distance therefrom as shown in FIGS. 4A and 4B, the optical member is provided to compensate for such change. For this purpose, the optical member is structured so that the quantity of transmission of light is small at the center of the member and increases toward the peripheral portions thereof, while the light transmitting characteristics of the optical member are unchanged.

Figure 8:
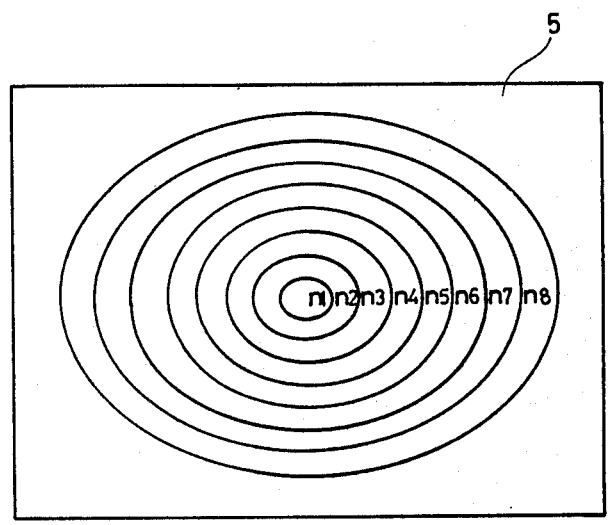
FIG. 8 is an illustration for explaining correcting means in a third embodiment of the present invention.

An example of the optical member is a neutral density filter 5 as shown in FIG. 8. This neutral density filter 5 is structured to have densities n1 to n8 gradually decreasing from the center to the peripheral portion thereof.

Thus, the following relation is established.

$$n1>n2>n8$$

By using the thus structured neutral density filter 5, an object can be determined to be at the same distance no matter what element out of the silicon photodiode elements receives the light from the object.

As for the neutral density filter 5, it may be structured to have a density continuously changed instead of the above stated filter having densities changed by steps.

Fourth embodiment

A fourth embodiment of the invention will be described. This embodiment also uses an optical member having a quantity of transmission of light smallest at its center and increasing toward its peripheral portion, the light transmitting characteristics thereof being unchanged.

Figure 9:
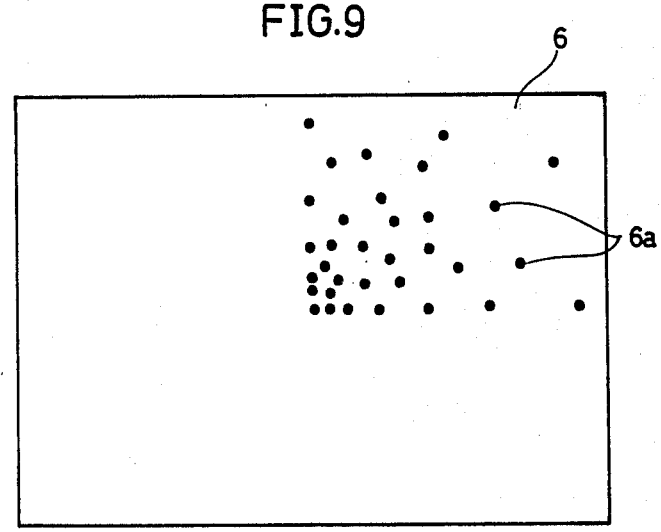
FIG. 9 is an illustration for explaining correcting means in a fourth embodiment of the present invention.

More specifically, a filter 6 having a pattern containing small dots 6a as shown in FIG. 9 is used as the optical member. The dots 6a of this filter 6 absorb light and the transmittivity of light is decreased as the density of dots increases. Accordingly, the filter 6 shown in FIG. 9 has the transmittivity of light decreased at the center and increased toward the peripheral portions thereof.

By using this filter 6, an object at an equal distance from the silicon photodiode elements can also be determined to be at the same distance no matter what element out of the silicon photodiode elements receives the light from the object.

The other construction of the fourth embodiment is the same as the first embodiment and therefore description thereof is omitted.

The present invention includes other embodiments as follows.

(A) The present invention is applicable not only to the distance measuring apparatus of the reflection light quantity type as shown in FIG. 1 but also to other distance measuring apparatus of a triangular measurement type and the like.

(B) Although a silicon photodiode is used as the light receiving device in the above described embodiments, any light receiving device may be used insofar as it has the prescribed functions.

(C) The present invention is not limited to a distance measuring apparatus using flash light but is applicable widely to distance measuring apparatus for measuring a distance to an object having regions providing different outputs although the distance is determined to be the same by measurement at multiple points. For example, the present invention is applicable to a istance measuring apparatus in which the quantity of light of a common light receiving lens is decreased in its peripheral portion if the distance to an object is measured at multiple points using the common light receiving lens under normal light without using flash light. Thus, the present invention is applicable widely to correct errors in measurement of a distance to an object at multiple points.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A distance measuring apparatus for determining a distance to an object, comprising:
   light emitting means for projecting light toward a direction for detecting a distance, said light emitting means having difference in quantities of light to be projected dependent on angles of projection;
   light receiving means for receiving reflected light obtained when said light projected from said light emitting means is reflected on said object existing in the light projecting direction, said light receiving means comprising a converging lens for converging said reflected light and photoelectric converting means for receiving said reflected light converged by said converging lens and providing an electric signal dependent on the quantity of received light, said converging lens having difference in light transmittivity values among the central portion thereof and peripheral portions thereof;
   compensating means for compensating the difference in quantities of projected light dependent on the projecting angles of said light emitting means together with the difference in light transmittivity values of said converging lens thereby making said electric signal constant whenever a distance to said object within a range to be measured is constant, irrespective of the difference in the quantities of projected light and the difference in light transmittivity values; and
   distance determining means for determining said distance to said object based on said electric signal provided from said photoelectric converting means.

2. A distance measuring apparatus in accordance with claim 1, wherein
   said compensating means comprises an optical filter provided between said converging lens and said photoelectric converting means and said optical filter causes light transmitting amounts in peripheral portions of a light path to be larger than a light transmitting amount in the central portion of said light path.

3. A distance measuring apparatus in accordance with claim 1, wherein
   said compensating means causes a change in light receiving area of said photoelectric converting means so that said area is increased from the central portion to peripheral portions thereof.

4. A distance measuring apparatus in accordance with claim 1, wherein
   said light emitting means comprises an electronic flash device and said difference in quantities of projected light depends on light distribution characteristics of said electronic flash device.

5. A distance measuring apparatus in accordance with claim 2, wherein
   said light emitting means comprises an electronic flash device and said difference in quantities of projected light depends on light distribution characteristics of said electronic flash device.

6. A distance measuring apparatus in accordance with claim 3, wherein
   said light emitting means comprises an electronic flash device and said difference in quantities of projected light depends on light distribution characteristics of said electronic flash device.

7. A distance measuring apparatus for determining a distance to an object to be photographed, comprising:
   light emitting means for projecting light at least toward an area to be photographed, said light emitting means having difference in quantities of said projected light dependent on angles of projection;
   light receiving means for receiving reflected light obtained when said projected light from said light emitting means is reflected on said object in said area to be photographed, said light receiving means comprising a converging lens for converging said reflected light having difference in light transmittivity values among the central portion of said lens and peripheral portions thereof and a plural number of photoelectric converting members for receiving said reflected light from said object respectively located in each prescribed position in said area to be photographed and with a photoelectric converting member providing an electric signal dependent on the quantity of light received thereby;
   compensating means for compensating the difference in quantities of projected light dependent on the projecting angles of said light emitting means together with the difference in light transmittivity values of said converging lens thereby providing an equal electric signal irrespective of what member out of said plural number of photoelectric converting members receives reflected light from an object located at a given distance within said area to be photographed; and
   distance determining means for determining a distance to said object in said area corresponding to each of said photoelectric converting members, based on an electric signal from each of said photoelectric converting members.

8. A distance measuring apparatus in accordance with claim 7, wherein
said compensating means comprises an optical filter provided betwen said covnerging lens and said photoelectric converting members, and said optical filter causes light transmitting amounts in peripheral portions of a light path to be larger than a light transmitting amount in the central portion of said light path.

9. A distance measuring apparatus in accordance with claim 7, wherein
said compensating means comprises light receiving area defining means for defining a light receiving area of each of said plural number of photoelectric converting members, and said light receiving area defining means defines said light receiving areas in a manner in which the light receiving area of a photoelectric converting member for receiving reflected light from said object, located relatively in a peripheral portion in said area to be photographed is larger than the light receiving area of a photoelectric converting member for receiving reflected light from said object, located relatively in a central portion of said area to be photographed.

10. A distance measuring apparatus in accordance with claim 7, wherein
said light emitting means comprises an electronic flash device and said difference in quantities of projected light depends on light distribution characteristics of said electronic flash device.

11. A distance measuring apparatus in accordance with claim 8, wherein
said light emitting means comprises an electronic flash device and said difference in quantities of projected light depends on light distribution characteristics of said electronic flash device.

12. A distance measuring apparatus in accordance with claim 9, wherein
said light emitting means comprises an electronic flash device and said difference in quantities of projected light depends on light distribution characteristics of said electronic flash device.

13. A distance measuring apparatus in accordance with claim 7, wherein
said compensating means comprises a plural number of determining means with one of said determining means corresponding to one of said respective photoelectric converting members, said plural number of determining means determining output electric signals from said respective photoelectric converting members by comparing said output electric signal with respective prescribed reference values, said respective reference values in said plural number of determining means being made different.

14. A distance measuring apparatus in accordance with claim 13, wherein
the reference value of a determining means corresponding to a photoelectric converting member for receiving reflected light from said object, located relatively in a peripheral portion of said area to be photographed is made lower than that of a determining means corresponding to a photoelectric converting member for receiving reflected light from said object, located relatively in a central portion of said area to be photographed.

15. A distance measuring apparatus in accordance with claim 13, wherein
said light emitting means comprises an electronic flash device and said difference in quantities of projected light depends on light distribution characteristics of said electronic flash device.

16. A distance measuring apparatus in accordance with claim 14, wherein
said light emitting means comprises an electronic flash device and said difference in quantities of projected light depends on light distribution characteristics of said electronic flash device.

17. A reflected light detecting apparatus, comprising:
light emitting means for projecting light toward a direction, said light emitting means having difference in quantities of projected light dependent on projecting angles;
light receiving means for receiving reflected light obtained when said light projected from said light emitting means is reflected on an object existing in the direction in which said light is projected, said light receiving means comprising a converging lens for converging said reflected light having difference in light transmittivity values among the central portion of said lens and peripheral portions thereof and a plural number of photoelectric converting members for receiving said reflected light from said object located in each prescribed position in said area to be photographed thereby producing a plurality of electric signals dependent on quantities of said received light;
an electrical circuit for processing said electric signals and producing result signals corresponding to said photoelectric converting members, respectively; and
compensating means for compensating the difference in quantities of projected light dependent on the projecting angles of said light emitting means together with the difference in light transmittivity values of said converging lens thereby making said electrical circuit to provide an equal result signal irrespective of what member out of said plural number of members receives reflected light from an object under a given condition.

18. A reflected light detecting apparatus in accordance with claim 17, wherein
said compensating means comprises an optical filter provided in front of said photoelectric converting members, and said optical filter causes light transmitting amounts in peripheral portions of a light path to be larger than a light transmitting amount in the central portion of said light path.

19. A reflected light detecting apparatus in accordance with claim 17, wherein
said compensating means comprises light receiving area defining means for defining a light receiving area of each of said plural number of photoelectric converting members, and said light receiving area defining means defines said light receiving areas in a manner in which the light receiving area of a photoelectric converting member for receiving reflected light from said object, located relatively in a peripheral portion in said area to be photographed is larger than the light receiving area of a photoelectric converting member for receiving reflected light from said object, located relatively in a central portion of said area to be photographed.

20. A reflected light detecting apparatus in accordance with claim 17, wherein
said light emitting means comprises an electronic flash device and said difference in quantities of projected light depends on light distribution characteristics of said electronic flash device.

21. A reflected light detecting apparatus in accordance with claim 18, wherein
said light emitting means comprises an electronic flash device and said difference in quantities of projected light depends on light distribution characteristics of said electronic flash device.

22. A reflected light detecting apparatus in accordance with claim 19, wherein
said light emitting means comprises an electronic flash device and said difference in quantities of projected light depends on light distribution characteristics of said electronic flash device.

23. A reflected light detecting apparatus in accordance with claim 17, wherein
said compensating means comprises a plural number of determining means with one of said determining means corresponding to one of said respective photoelectric converting members, said plural number of determining means determining output electric signals from said respective photoelectric converting members by comparing said output electric signals with respective prescribed reference values, said respective reference values in said plural number of determining means being made different.

24. A reflected light detecting apparatus in accordance with claim 23, wherein
the reference value of a determining means corresponding to a photoelectric converting member for receiving reflected light from said object, located relatively in a peripheral portion of said area to be photographed is made lower than that of a determining means corresponding to a photoelectric converting member for receiving reflected light from said object, located relatively in a central portion of said area to be photographed.

25. A reflected light detecting apparatus in accordance with claim 23, wherein
said light emitting means comprises an electronic flash device and said difference in quantities of projected light depends on light distribution characteristics of said electronic flash device.

26. A reflected light detecting apparatus in accordance with claim 24, wherein
said light emitting means comprises an electronic flash device and said difference in quantities of projected light depends on light distribution characteristics of said electronic flash device.

27. A reflected light detecting apparatus, comprising:
light emitting means for projecting light toward a direction, said light emitting means having difference in quantities of projected light dependent on projecting angles;
light receiving means for receiving reflected light obtained when said light projected from said light emitting means is reflected on an object existing in the direction in which said light is projected, said light receiving means comprising a plural number of photoelectric converting members for receiving said reflected light from said object located in each prescribed position in said area to be photographed thereby producing a plurality of electric signals dependent on quantities of said received light;
an electrical circuit for receiving said electric signals, processing them and producing result signals corresponding to said photoelectric converting members, respectively; and
compensating means for electrically compensating the difference in quantities of projected light dependent on the projecting angles of said light emitting means thereby making said electrical circuit to provide an equal result signal irrespective of what photoelectric converting member out of said plural number of photoelectric converting members receives reflected light from an object under a given condition.

* * * * *